Nov. 30, 1954 W. A. KROPP 2,695,491

CLOCK CORRECTING MEANS CONTROLLED BY RADIO TIME SIGNALS

Filed April 7, 1953 6 Sheets-Sheet 1

INVENTOR
WILLIS A. KROPP
BY
Geoffrey Knight
ATTORNEY

Nov. 30, 1954 W. A. KROPP 2,695,491

CLOCK CORRECTING MEANS CONTROLLED BY RADIO TIME SIGNALS

Filed April 7, 1953 6 Sheets-Sheet 2

INVENTOR
WILLIS A. KROPP
BY Geoffrey Knight
ATTORNEY

Nov. 30, 1954 W. A. KROPP 2,695,491

CLOCK CORRECTING MEANS CONTROLLED BY RADIO TIME SIGNALS

Filed April 7, 1953 6 Sheets-Sheet 3

INVENTOR
WILLIS A. KROPP
BY Geoffrey Knight
ATTORNEY

CLOCK CORRECTING MEANS CONTROLLED BY RADIO TIME SIGNALS

Filed April 7, 1953

6 Sheets-Sheet 4

INVENTOR
WILLIS A. KROPP
BY Geoffrey Knight
ATTORNEY

Nov. 30, 1954 W. A. KROPP 2,695,491

CLOCK CORRECTING MEANS CONTROLLED BY RADIO TIME SIGNALS

Filed April 7, 1953 6 Sheets-Sheet 5

INVENTOR
WILLIS A. KROPP
BY Geoffrey Knight
ATTORNEY

Nov. 30, 1954 W. A. KROPP 2,695,491

CLOCK CORRECTING MEANS CONTROLLED BY RADIO TIME SIGNALS

Filed April 7, 1953 6 Sheets-Sheet 6

INVENTOR.
WILLIS A. KROPP
BY Geoffrey Knight
ATTORNEY

United States Patent Office 2,695,491

Patented Nov. 30, 1954

2,695,491

CLOCK CORRECTING MEANS CONTROLLED BY RADIO TIME SIGNALS

Willis A. Kropp, Owego, N. Y., assignor to International Business Machines Corporation, New York, N. Y., a corporation of New York Application April 7, 1953, Serial No. 347,228

8 Claims. (Cl. 58—35)

This invention relates to clocks which are synchronized with an accurate time standard by means of radio time signals, such as the official time signals of the National Bureau of Standards station, WWV. It may be regarded as an improvement on the invention disclosed in the application of Clinton E. Larrabee and Carl T. Young, Serial No. 347,313, filed April 7, 1953.

In the Larrabee et al. application referred to the identification of the time signal as a true time signal, with enough strength at its start and near its end to be utilized for correction, was accomplished with the aid of a signal timer. A utilizable signal would start the timer at the beginning of the signal, then, near the end of the signal the timer would close a circuit to test the signal. A positive result of the test would permit a correction cycle to be initiated. The time of initiation of the correction cycle was determined by the timer, rather than by the end of the official signal itself.

It is an object of the present invention to improve the Larrabee and Young correction device, so that the instant at which the correction cycle is initiated coincides with the termination of the official time signal.

The WWV time signal which may be used for correcting clocks is a 4-minute tone signal repeated every 10 minutes. In the Larrabee et al. application referred to one such signal each hour is tested and if it is below the required strength the clock awaits the signal one hour later.

Other objects of the invention will be pointed out in the following description and claims and illustrated in the accompanying drawings, which disclose, by way of example, the principle of the invention and the best mode which has been contemplated of applying that principle.

Figure 1:
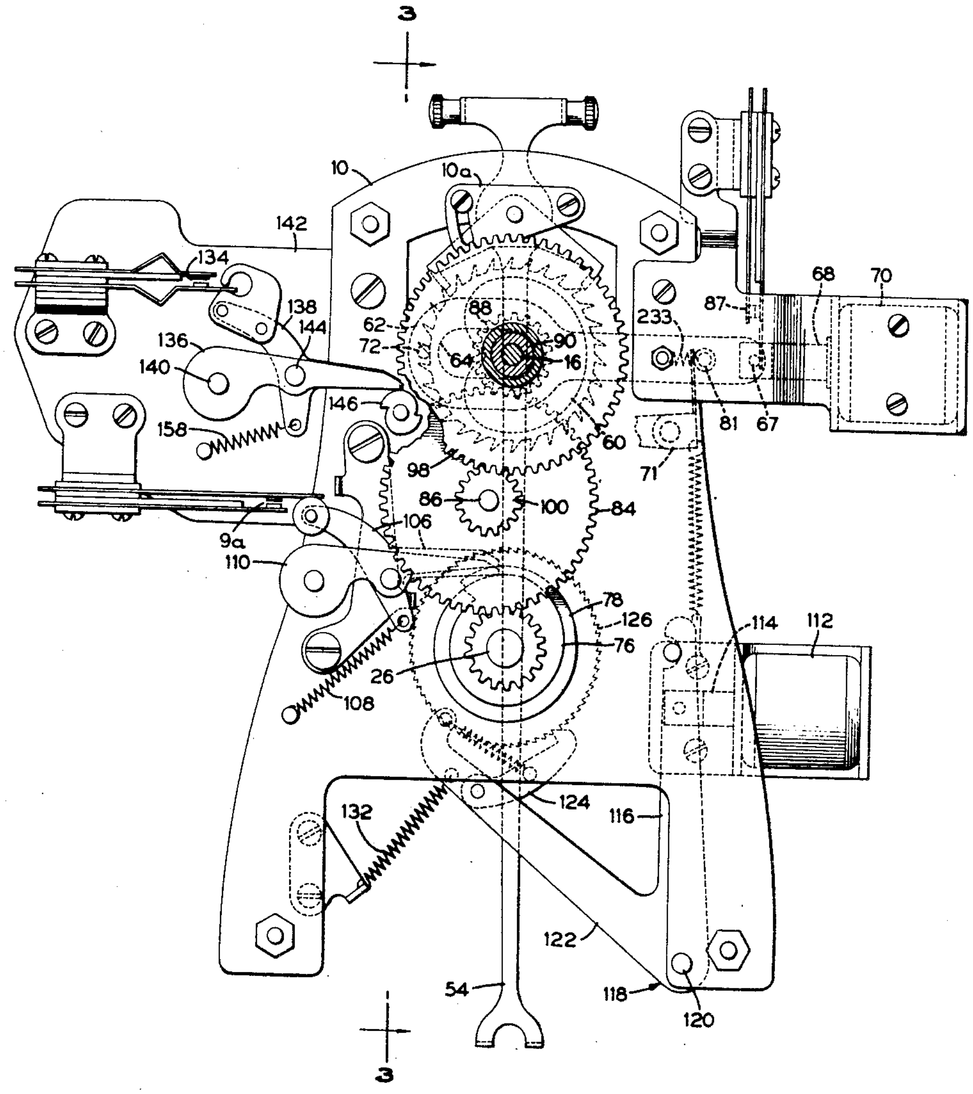
Fig. 1 is a vertical section of a master clock embodying the invention, substantially on the line 1—1 of Fig. 3.

By way of illustration of the invention it is shown embodied in a master clock of the type shown in Larrabee patent, 1,878,931. This is a clock of good accuracy of the kind used for regulating secondary clocks. When well adjusted it will keep time within few seconds a day. By means of the present invention such a clock can be made to keep time indefinitely with a variation no greater than ½ second from the time established by standard time signals. The clock shown in the drawing can be restored to true time if it is not more than 10 seconds slow or fast. If it has a greater error at the time the correction signal is received the correction mechanism operates idly until the clock is reset by hand.

The clock comprises two plates 10 and 12 united by pillars 14 into a rigid frame. Mounted in bearings in these plates is a seconds shaft 16 having a seconds hand 18 secured to the front end and a pinion 20 fixed near its rear end. The pinion 20 is driven by a spring 22 through gearing comprising a large gear 24 fixed to a shaft 26 and meshing with a small gear 28 fixed to a shaft 30, which also has secured upon it a large gear 32 meshing with pinion 20.

Revolvably mounted on the seconds shaft is a unit consisting of a barrel 34, an escape wheel 36, a ratchet wheel 38, and a serrated clutch disc 40 having 60 teeth. A clutch lever arm 42 secured by a hub 44 on the seconds shaft 16 carries a ball 46 which engages the clutch disc 40 under the pressure of a spring 48. Thereby the escape wheel and the seconds shaft are normally retained in the same angular relationship, but this can be changed by slipping the clutch ball over the clutch disc.

A verge 50 mounted by its shaft 52 in the plates 10 and 12 coacts with the escape wheel 36 in the usual manner. The verge shaft 52 has adjustably mounted upon it a pendulum arm 54.

*Resetting mechanism*

Also affixed to the hub 44 is a heart cam 60. Adjacent the heart cam is a slide bar 62 having elongated guide opening 64 whereby it is slidably mounted on a grooved bushing 66 fixed to the plate 10. One end of the slide bar is attached to the shaft 68 of a solenoid 70, which will be referred to as the correction solenoid. At the outer end of the slide bar is a pin 72 which is adapted to engage the heart cam when the solenoid shaft is pulled to the right and, by sliding into the notch of the heart cam, to position the seconds shaft in an exact position, namely, the 60th second position in this case.

Figure 2:
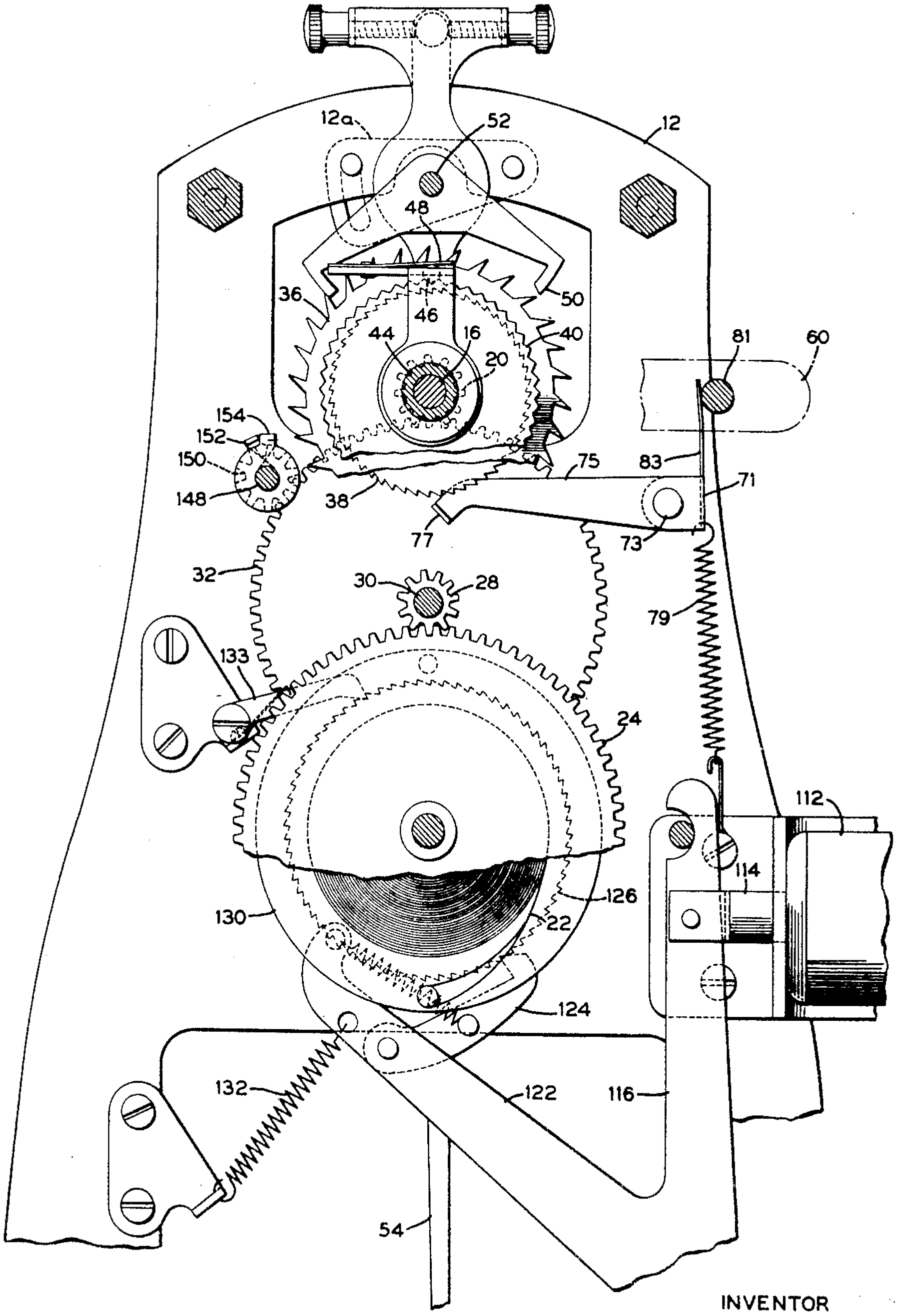
Fig. 2 is a vertical section of the same clock, substantially on the line 2—2 of Fig. 3.
Figure 3:
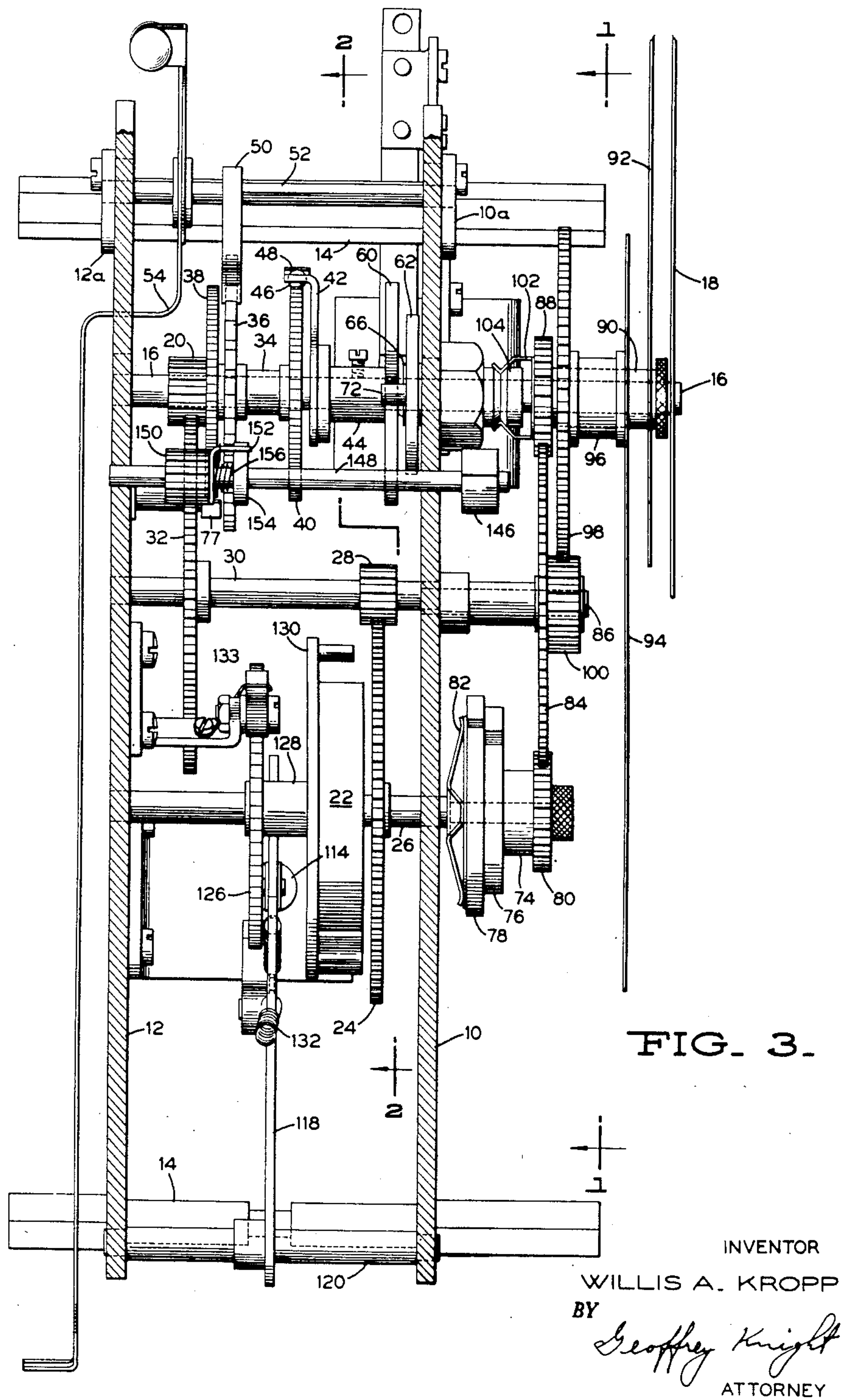
Fig. 3 is a vertical section of the clock, substantially on the line 3—3 of Fig. 1.

Coacting with the ratchet wheel 38 (Fig. 2) is a rock lever 71 pivoted on a stationary shaft 73 and having an arm 75 with an ear 77 adapted to engage the ratchet wheel when the rock lever is tilted clockwise by a spring 79. This occurs whenever the resetting slide 60 moves to the right in Fig. 2 and its pin 81 releases an arm 83 of rock lever 71. The rock lever prevents backward movement of the escape wheel 36 if the seconds shaft is reset counterclockwise from a fast position. Forward movement of the escape wheel when the seconds shaft is reset from a slow position is prevented by whichever arm of the verge is engaging the escape wheel at the time.

An extension of pin 85, which articulates slide 62 to shaft 68 opens a knock off contact 87 each time the correction solenoid 70 operates.

The main spring shaft 26, governed by the escapement mechanism, turns at the rate of one revolution per hour. On the front end of the shaft 26 is revolvably mounted a unit consisting of a hub 74, two cams 76 and 78, and a gear 80. This unit is driven by the shaft 26 through a spring friction spider 82. Through an idler gear 84 revolvably mounted on a stationary shaft 86 the gear 80 drives at one revolution per hour a gear 88 fixed to the minutes shaft 90 which carries the minutes hand 92. The hours hand 94 carried by shaft 96 is driven at one revolution in 12 hours by gears 98 and 100. The minute and hour shaft assembly is held in place on the seconds shaft by a spring clip 102 secured to the gear 88 and engaging a stationary grooved bushing 104.

When the minutes and hours hands are manually set the friction spider 82 slips on the face of cam 78. When the seconds shaft is reset by the heart cam mechanism the minutes and hours hands are driven proportionately by the turning of shaft 26.

The cams 76 and 78 control so-called "hour contacts" *9a* through a conventional lever assembly of the type shown in Larrabee patent, 1,878,931. At 56′ 00″ of each hour the horizontal arm of lever 106 drops off the step of cam 78 and the lever is rocked by spring 108 to close contact *9a*. At 58′ 32″ lever 110 drops off the step of cam 76 and lever 106 moves down bodily to allow contact *9a* to open.

The clock spring 22 is electrically wound by a solenoid 112. The shaft 114 of the solenoid is connected to one arm 116 of a bell crank lever 118 mounted on a rocking pivot 120. The other arm 122 carries a spring influenced dog 124 which engages a ratchet wheel 126 fixed to the hub 128 of the spring anchor plate 130. The winding solenoid receives an impulse each minute and its shaft pulls the dog 124 to the right one tooth on the ratchet wheel 126. When the impulse ends a spring 132 pulls the bell crank lever 118 to the left and the dog rotates the ratchet wheel.

The winding impulse comes from a pair of contacts 134 actuated by a lever assembly comprising two levers 136 and 138. The former is pivoted at 140 on a frame plate 142 while the latter is pivoted at 144 to lever 136. The right ends of levers 136 bear on a double lobed cam 146. The shaft 148 of cam 146 is driven at one-half revolution per minute by a pinion 150 engaging gear 32. The pinion 150 is free on shaft 148, but drives the shaft through a coupling comprising an arm 152 on the pinion, a stepped disc 154 fixed to the shaft, and a spring 156 yieldingly holding the arm against the step of the disc. This construction avoids damage if the seconds shaft is reset backward at a time when the step of cam 146 first each minute. A spring 158 rocks lever 136 and 138. The right end of lever 138 is a little shorter than that of lever 136 and drops off of a step of cam 146 firt each minute. A spring 158 rocks lever 138 to close contact 134. Shortly afterward the arm 136 drops and the contact opens. The closure of contact 134 sends a winding impulse to solenoid 112, through a circuit to be referred to later.

*Signal timer*

Figure 4:
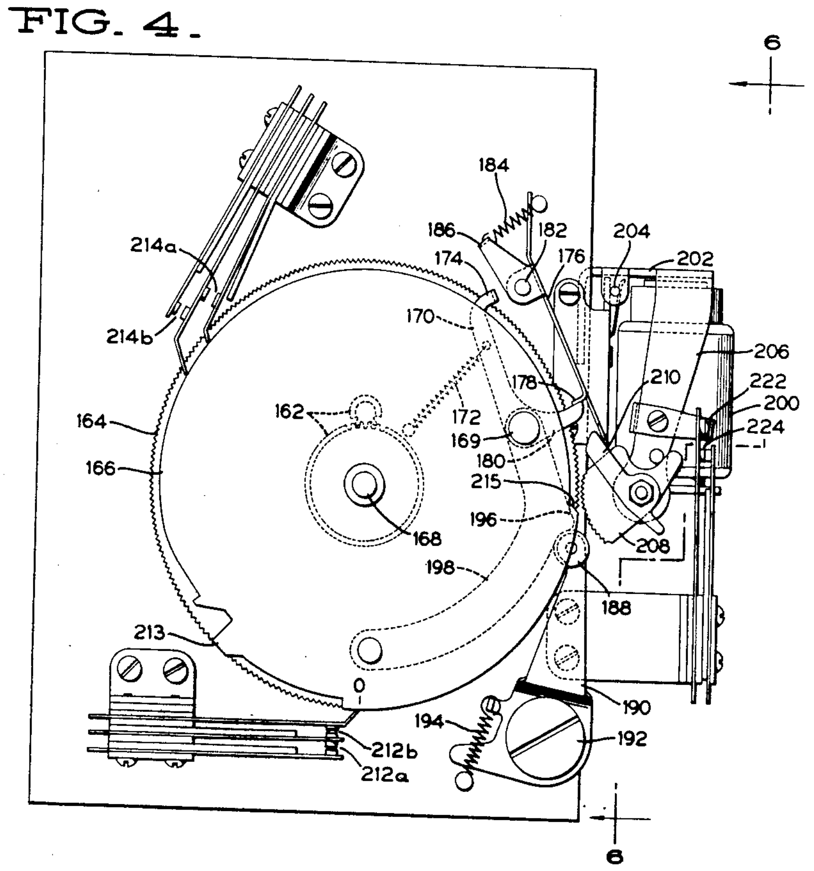
Fig. 4 is a front elevation of the signal timer.
Figure 5:
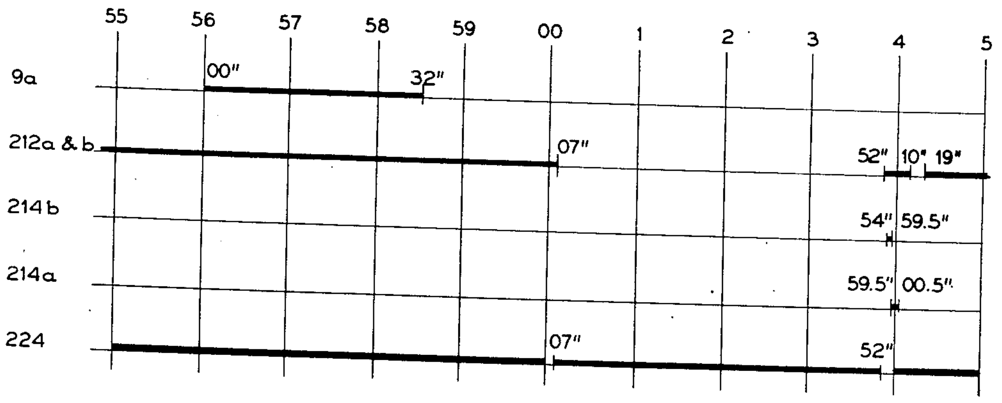
Fig. 5 is a timing chart.
Figure 6:
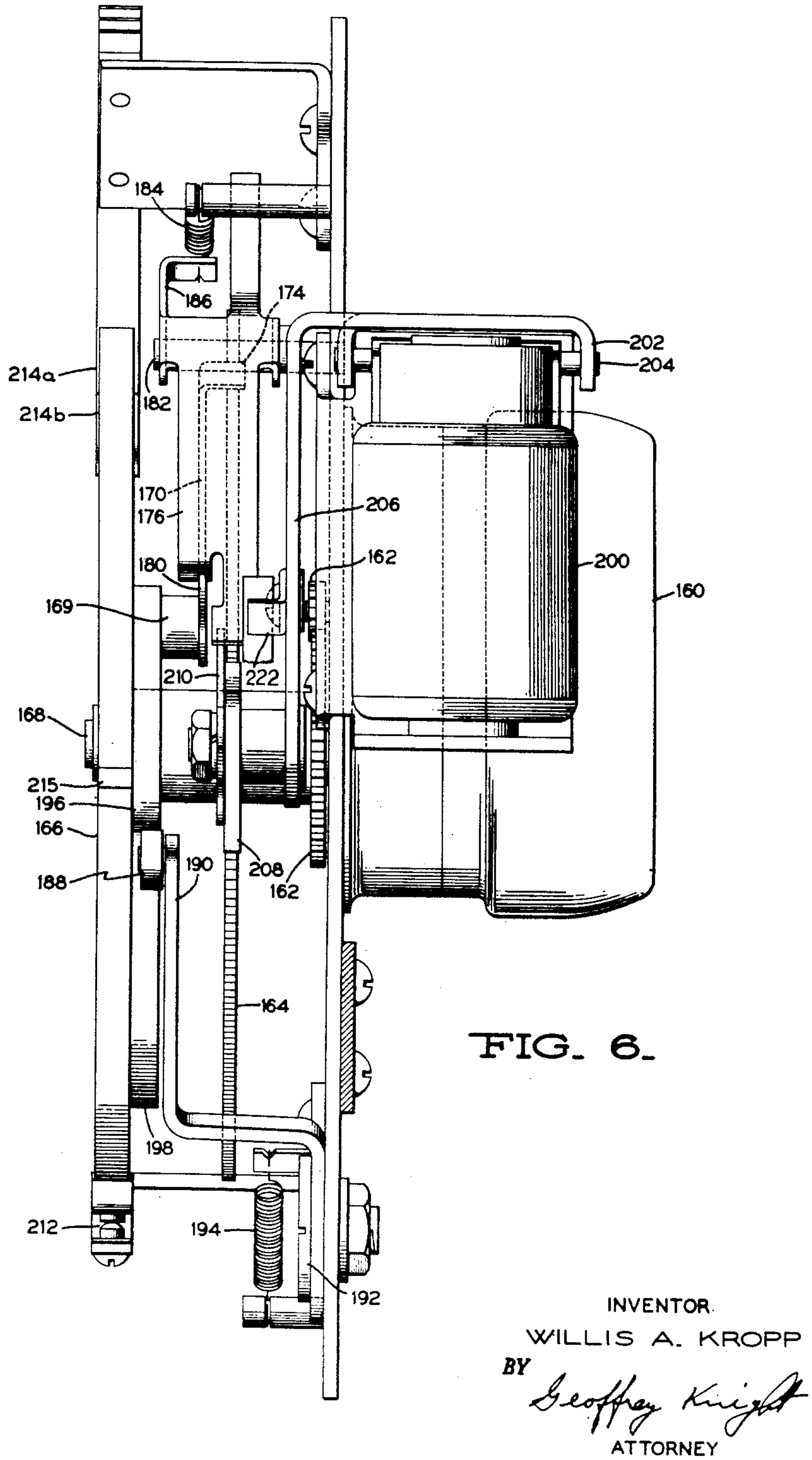
Fig. 6 is a vertical section of the timer, substantially on the line 6—6 of Fig. 4.
Figure 7:
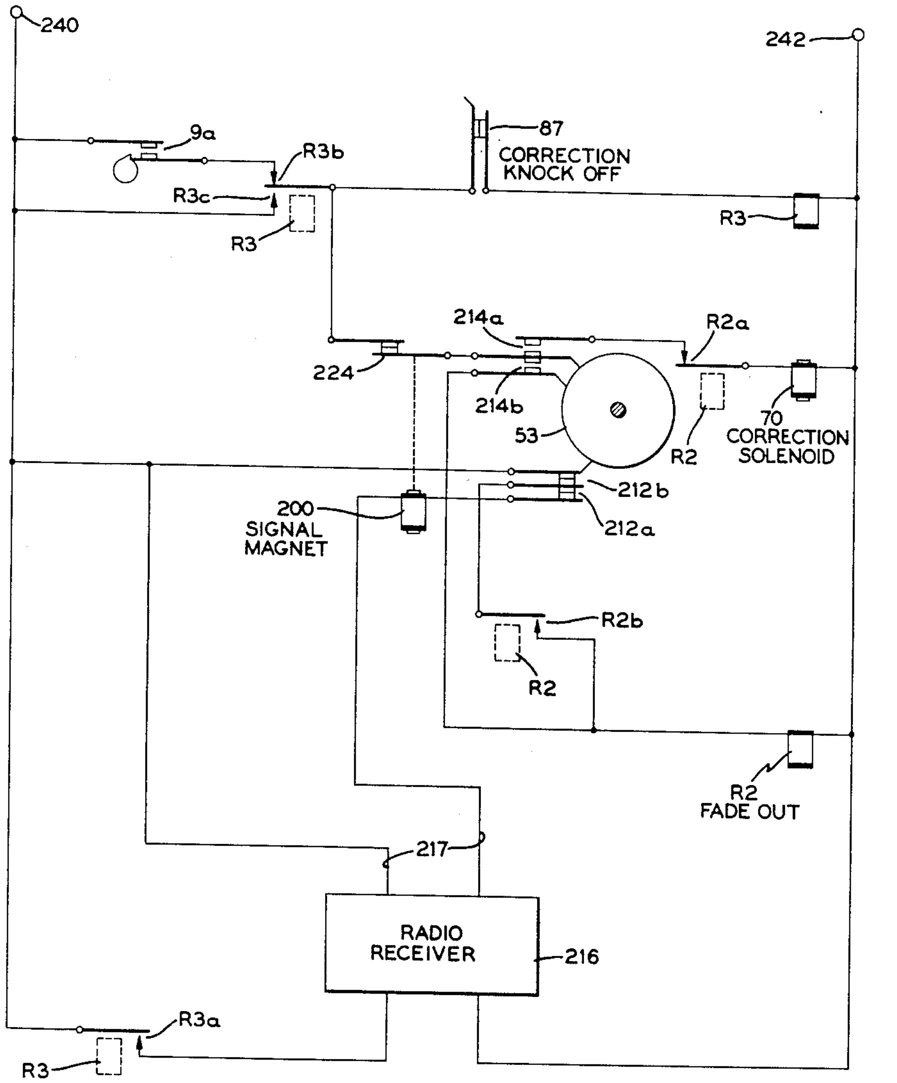
Fig. 7 is a circuit diagram.

In using radio time signals for correcting clocks it is necessary to avoid responses to static. For the purpose of distinguishing the four minute WWV time signals a special 5 minute timer shown in Figs. 4 and 5 is used. This timer is set in operation by the beginning of the signal and causes the signal to be tested again near the end of the four minute period. If the receiver is being energized by a signal of sufficient strength at this time a clock correction action is initiated.

The signal timer is driven by a synchronous motor 160. The output shaft 162 of the motor drives a serrated clutch disc 164 continuously at the rate of one revolution in five minutes. A cam disc 166 is rotatably mounted on the shaft 168 of the clutch disc. Pivoted on the cam disc is a clutch dog 170 which is urged by a spring 172 in the direction to cause its ear 174 to engage the serrated clutch disc 164. In the normal stationary condition of the cam the clutch dog is held disengaged by a detent 176, which has an ear 178 bearing against a radially projecting arm 180 of the clutch dog. The detent is mounted on a stationary pivot 182 and urged clockwise by a spring 184 connected to its arm 186. In its detented condition the cam disc is urged counterclockwise by a roller 188 on a lever 190 pivoted at 192 and urged in counterclockwise direction by a spring 194. As the timer cam is approaching the end of a revolution the roller rides over a hump 196 on a cam plate 198 attached to the side of a cam disc 166 and completes the movement of the cam disc to its index position, after the clutch dog 170 has been disengaged by detent 176.

The clutch disengaging detent 176 is moved to clear the clutch dog by a mechanism operated by a tone magnet 200, that is to say, a magnet operated by the radio signal. The armature 202 of this magnet is pivoted at 204 and has an arm 206 bearing at its end a pivotally mounted rocking sector 208 having a serrated edge adapted to engage the serrated periphery of the clutch disc 164. When the tone magnet is energized the serrated sector is moved against the clutch disc and begins to rotate clockwise. An arm 210 having a rigid but adjustable relation to the serrated sector 208 then engages the detent 176 and lifts it clear of the arm 180 of the clutch dog. The dog engages the clutch disc 164 and cam 166 begins a revolution which will be completed in five minutes. At this time the signal will have finished and the tone magnet 200 will be de-energized. The detent will therefore be in position to disengage the clutch dog and the cam disc will be latched up in its index position, as the roller 188 rolls down the back of the hump 196.

The cam disc 166 operates two sets of spring contacts. The contacts 212*a* control the circuit of the tone magnet while the contacts 212*b* control a hold circuit to be referred to later. Both sets of contacts close and open together. They are closed when the cam disc is in its stationary position but open shortly after the cam disc begins to revolve, so that the toothed sector 208 will be withdrawn from the serrated clutch disc by the de-energization of the tone magnet. They are closed again later in the cycle of the timer, for a purpose to be described.

The second set of contacts 214*b* and 214*a* are, respectively, for testing the tone near the end of the timing period and for transmitting the resetting signal, if the tone is found to have sufficient strength at the time it is tested. The operation and timing of these contacts will be explained more fully in connection with the circuit diagram.

The radio time signals are received by a pretuned radio receiver of conventional design, the circuit of which is not shown. When the signal is on, the radio receiver produces a D. C. signal at its output terminals.

*Operation and circuit*

The operation of the device in response to various conditions will now be described. The description will first take up the normal case of a radio signal of sufficient strength and without static interference. The device as disclosed is designed to set the clock in response to the 600 cycle tone signal which is transmitted at 00′ 00″. This signal ends at 04′ 00″ and if the clock is not more than 10 seconds slow or fast it is corrected to the 4th minute position, by setting the seconds hand to the 60th second position.

The signal is received by a pretuned radio receiver 216 which, when a signal is received, causes a D. C. voltage to appear at the output terminals 217. The radio receiver is normally unheated and is turned on at 56′ 00″ 4 minutes before the 600 cycle signal begins at 00′ 00″, by the following circuit means: At 56′ 00″ the hour contact 9*a* of the master clock closes, completing the following circuit: Terminal 240 contact 9*a*, normally closed contacts R3*b* and 87, coil of relay R3, terminal 242. Relay R3 is energized and its make before break contacts R3*b*, R3*c* transfer, opening the pickup circuit and closing a hold circuit for R3, through points 87 and R3*c*. Contact R3*a* closes, completing an obvious circuit to the power supply of the radio receiver 216.

When the timer cam 166 is in its latched-up position contacts 212*a* and 212*b* are closed. At 00′ 00″ the signal is received and the signal magnet 200 is energized by a circuit leading from one output terminal of the receiver 216, contacts 212*b*, 212*a*, magnet 200, to the other output terminal of the receiver. The armature 202 is attracted and sector 208 is engaged with serrated clutch disc 164. A bracket 222 on arm 206 opens normally closed contact 224. If the signal continues in sufficient strength, at the end of three seconds the arm 210 lifts the detent 176 clear of the clutch dog arm 180 and the clutch engages. At 00′ 07′ contact 212*a* opens and the tone magnet is de-energized, allowing the toothed sector 208 to drop clear of the clutch disc. The timer cam continues to rotate.

At 3′ 52″ contacts 212*a* and 212*b* close and the signal magnet is energized again. Contact 224 opens. From 3′ 54″ to 3′ 59.5″ contact 214*b* is closed, testing the signal for strength. If at any time during this 5½″ interval the signal strength drops below that which is required to keep the signal magnet 200 energized the contact 224 will close and a circuit will be completed as follows: From terminal 240 through R3*c*, transferred, contacts 224 and 214*b*, and the coil of R2, to terminal 242. Relay R2 is energized and R2*a* opens. This prevents a circuit from being completed through the correction solenoid 70.

If, on the other hand, the signal magnet remains sufficiently energized throughout the test time from 54″ to 59.5″ the relay R2 remains de-energized and at 59.5″, when contact 214*a* closes, a circuit through the correction solenoid is prepared. This circuit is completed when the signal ends and the signal magnet 200 is de-energized, closing contact 224. The circuit extends from terminal 240, through R3*c*, transferred, contacts 224, 214*a*, R2*a*, which are in the normally closed position when the fadeout relay R2 is not energized, and the coil of correction solenoid 70, to terminal 242. The correction solenoid is energized and the slide 62 executes a stroke to the right. If the clock is either fast or slow by an amount not more than 10″, the seconds hand is restored to the sixtieth second position by the pin 72 on the slide 62.

The second condition which will be considered will be the fading of the signal after the timer has been started. It will be assumed that at 3′ 54″, when the contact 214*b* closes, the signal strength is below the minimum required and contact 224 is closed. A circuit is then completed to the fadeout relay R2, as previously traced, energizing this relay. The contact R2*b* closes, extending a holding circuit for relay R2 through contact 212*b* to terminal 240. The contact R2*a* opens and it is not possible for a circuit to be completed to the correction solenoid thereafter, until the relay R2 is de-energized again. At 4′ 10″ contacts 212*a* and 212*b* open, breaking the holding circuit to relay R2, which becomes de-energized. Contact R2*a* closes and the correction solenoid circuit is restored to the normal condition.

Since the correction solenoid was not energized on the previous, defective time signal, the contact 87 was not opened and relay R3 remains energized. The contact R3*a* continues in the closed condition and the radio receiver remains heated. The timer cam continues its rotation, the contacts 212*a* and 212*b* being closed when the timer cam latches up at 5′.

When the next 600 cycle tone signal is received at 10′ 00″ the signal magnet 200 is again energized and the timer cam starts a new rotation. If this time signal passes the test of sufficient strength at the time contact 214*b* closes and terminates during the brief one second interval when contact 214*a* is closed, the correction solenoid 70 will be energized at 14′ 00″, causing the clock to be reset to the 14′ position by the action of the correction slide pin 72 on the heart cam 60. Thus, relay R3, once energized by the hour contact 9*a* of the clock, remains energized, and maintains the radio receiver in a heated condition, until there is a correction cycle. The correction means continues to test the signal each 10 minutes, until a signal is found having the minimum strength required and the correct length characteristic. When such a signal is found the relay R3 is de-energized during the correction cycle and the radio receiver is turned off, to be turned on again the next time the hour contact 9*a* closes.

The third condition now to be considered is that of a signal which starts too weak to energize the tone magnet 200 at the starting time, but which later becomes strong enough to energize this magnet. Assume that at 2 minutes past the hour the signal, which has been too weak to energize the tone magnet until then, becomes strong enough and the armature of the tone magnet is operated starting the signal timer cam 53. In accordance with the delay of the timer cam, the contact 214*b* will close at 5′ 54″. This is after the signal has terminated and the magnet 200 is deenergized. The contact 224 is closed and the circuit is completed, as previously traced, through the fadeout relay R2, energizing this relay. When the contact 214*a* closes at 5′ 59.5″, the contact 224 is closed, but the contact R2*a* is open and the correction solenoid is not operated. The fadeout relay is dropped out a short time later, as previously described, and the timer cam latches up. The relay R3 remains energized and the circuit is prepared to respond to the next 600 cycle signal, which should begin at 10′ 00″.

Only a signal which starts at the correct time with sufficient strength to energize the tone magnet and which has sufficient strength from test time, at 3′ 54″ to 3′ 59.5″, or equivalent interval in a later signal time of the hour, can start a correction cycle. If the signal fails in any of these respects the clock awaits the next signal 10 minutes later and continues to wait for signals until one arrives meeting all of the test requirements. One signal in one or two days is actually enough to keep a master clock within the range of 10 seconds either way. The limits of resetting mentioned are merely those of the illustrative clock shown and are not in any sense a limitation of the invention.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for correcting clocks by means of radio signals of definite length transmitted at predetermined times, clock resetting means, signal receiving means, a signal timer, means controlled by a signal received by said signal receiving means for starting said timer; and circuit means including a current operated device, a circuit closing device operated by said timer so as to be closed for a brief interval starting just before and ending just after the end of the signal which started said timer, and circuit closing means operated in response to the signal so as to be open while the signal is on and closed when the signal ends.

2. In a device for correcting clocks by means of radio signals of definite length transmitted at predetermined times, a signal timer, a signal receiver, signal operated means coupled to said signal receiver so as to be operated when a signal is being received, clock resetting means, actuating means for said clock resetting means, means whereby said actuating means is controlled by said signal operated means so as to be energized when said signal operated means ceases to be operated by a signal, and means controlled by said timer to render said actuating means subject to the control of said signal operated means only for a brief interval beginning just before and ending just after the end of a signal.

3. In a radio signal controlled clock, means responsive to the signals, a timer adapted to be started by said signal responsive means, electrically operated clock resetting means, a circuit therefore including two circuit breakers, one operated by said timer and the other by said signal responsive means, said timer operated circuit breaker being adapted to close for a brief interval starting just before the signal ends and said other circuit breaker being closed when the signal is off.

4. In a radio signal controlled clock, a signal timer, means responsive to the signals for starting said timer when a signal begins, clock correction means, means to initiate an operation of said correction means; means for transmitting a pulse to said correction initiation means at the end of the time signal, and means controlled by said timer for gating said signal end pulse so that, in order to reach said correction initiation means, it must occur within a brief interval at a definite length of time after the timer is started, which length of time is approximately equal to the length of the time signal.

5. In a device for resetting a clock in response to radio signals having two recognizable changes separated by a definite length of time, a signal timer adapted to measure a length of time approximately equal to said definite length of time, means responsive to the first of said changes of a signal for starting a measurement by said timer, clock correction means; means responsive to the second of said changes for causing an operation of said clock correcting means, and gating means controlled by said signal timer for preventing an operation of said clock correcting means if said second change does not coincide with a time interval determined by said timer.

6. A device as described in claim 5, wherein means controlled by said timer are provided to test the strength of the signal and to disable said means for causing an operation of said clock correcting means, if the signal strength drops below a predetermined level during an interval just preceding the operation of said gating means.

7. In a device for resetting a clock in response to radio signals having two recognizable changes separated by a definite length of time, a signal timer adapted to measure a length of time approximately equal to said definite length of time, means responsive to the first of said changes of a signal for starting a measurement by said timer, clock correction means, circuit means including a current responsive device for causing an operation of said clock correcting means, and gating means comprising a circuit closing device in said circuit means closed by said timer for only a brief interval supposed to coincide with said second signal change.

8. A device as described in claim 7, wherein said circuit means include a second circuit closing device, and means controlled by said timer and responsive to signal strength, for causing said second circuit closing device to be opened if the signal strength is below a predetermined level during an interval just preceding the operation of said gating means.

No references cited.